Sept. 24, 1940.   C. BRAGLIO   2,215,452

VENETIAN BLIND

Filed May 19, 1938

INVENTOR.
CHARLES BRAGLIO.
BY George L. Wallace
ATTORNEY.

Patented Sept. 24, 1940

2,215,452

UNITED STATES PATENT OFFICE 2,215,452

VENETIAN BLIND

Charles Braglio, Arnold, Pa., assignor to Aluminum Company of America, Pittsburgh, Pa., a corporation of Pennsylvania Application May 19, 1938, Serial No. 208,853

10 Claims. (Cl. 153—35)

This invention relates generally to an improved method for the fabrication of metal products having interlocking seams, such as, for example, tubing having a rectangular cross section of the type generally employed in the manufacture of Venetian blind slats and objects of like character.

The use of lock seam tubing in blind slat construction has the advantage of being light in weight and of being inexpensive. However, since a ductile metal is generally used in order that the interlocking edges extending longitudinally along the tube and composing the seam may be formed and joined, the need has long been felt for some provision to prevent the seam from becoming loosened and likewise to prevent twisting and torsional stress encountered by the slat in its normal use from impairing the seam, with resulting deformation of the slat.

Attempts have been made to overcome these difficulties by subjecting the seam as it is being formed in the tubing, to increased pressure between rolls and a mandrel, in order to crimp together more tightly the interlocking edges, thereby securing a tighter seam. Generally, however, the increased pressure due to this operation produces a buckling in the slat opposite the lock seam. Likewise, the lock seam has been welded or fastened mechanically, but welding and the use of mechanical devices increase the cost of manufacture and detract from the appearance of the slat.

The object of my invention is to improve the interlocking seam of products made from sheet metal, thereby preventing loosening or slipping of the seam upon application of stress. More particularly, my object is to provide, from sheet metal, a lock seam tube which is not deformed by ordinary torsional stresses.

The specific object of my invention is to provide an inexpensive method for strengthening the metal and the interlocking seam of a Venetian blind slat of rectangular cross section constructed from lock seam tubing, which does not deform the tubing, and which does not necessitate welding or the use of mechanical devices to hold and strengthen the seam.

In the following description, I refer to the accompanying drawing, in which.

Figure 1:
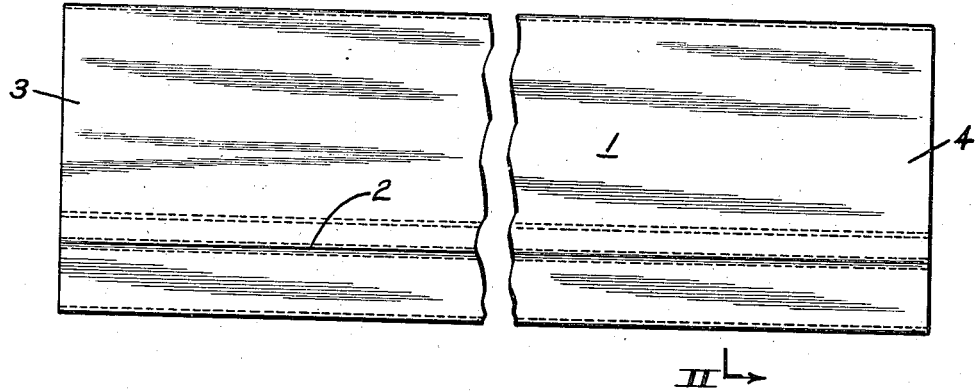
Fig. 1 is a plan view of a length of lock seam tubing suitable for use as a Venetian blind slat.
Figure 2:
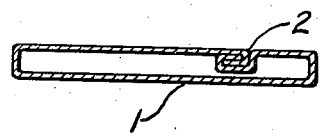
Fig. 2 is a section taken on line II—II of Fig. 1.
Figure 3:
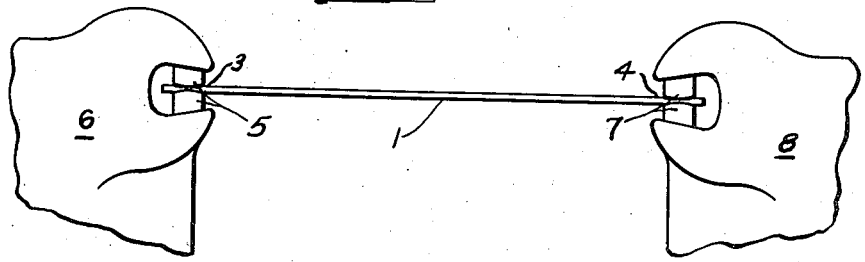
Fig. 3 is a diagrammatic view illustrating one method of practicing the invention.

In the drawing, reference numeral 1 denotes a flattened metal tube which may be produced in any conventional way. The usual practice is to manufacture the tubing from sheet metal by interlocking and compressing the edges along the length thereof to form the lock seam 2. The tubing generally is produced in round cross section, which is given the desired shape shown in Fig. 2 by a die drawing operation.

In practicing the invention, the ends 3 and 4 of the tubing or slat are inserted between the jaws 5 of a headstock 6 and between the jaws 7 of a tailstock 8 of a stretching machine. The jaws are tightly closed upon the ends of the tubing and the headstock is retracted by suitable mechanism not herein shown, the tailstock remaining stationary. The retraction of the headstock elongates and stretches the tubing in the direction of the seam thereby causing a reduction in the dimensions of the stretched material. This results in a locking of the seam in a direction normal to the force applied in the previous compressing action. After the tubing has been subjected to stretching above its yield point, the headstock is returned to its normal position and the jaws are opened to permit the removal of the tubing.

As a result of this stretching operation, the interlocking seam is crimped more tightly together and any bends or warped portions which may be present in the slat are straightened. Of special importance, however, are the changes effected in the properties of the metal. After being stretched, the seam and the slat are much stronger and more resistant to permanent deformation since the metal therein has been work hardened. Thus, if the slat is twisted and subjected to stresses encountered in its operation as a blind element, the metal being harder and of increased rigidity, the seam is not loosened and the slat returns to its original shape and does not remain permanently warped and deformed.

I have found that the best results are obtained when the metal is stretched slightly above its yield point. When the metal is stretched above that point, the operation imparts enough cold working to fragment and shift about the grains to give the metal the desired qualities of hardness and rigidity. However, if the metal is stretched greatly in excess of its yield point, the metal necks as the stress approaches the ultimate and gradually becomes thinner, and finally breaks.

My invention may be practiced with sheet metal of various gauges. However, it is best adapted for metal of sufficient gauge to withstand stretching, since very fine gauge sheet metal reaches the ultimate point and breaks too quickly upon application of stress in an ordinary stretching machine before the desired qualities are obtained from the cold working of the metal. For example, I have found that tubing composed of an aluminum alloy containing 1.25 per cent manganese, which is widely used in the manufacture of blind slats, ordinarily can be subjected to stretching with beneficial effect when the gauge sheet used is over .015 inch; but tubing and blind slats composed of this alloy having a finer gauge reach their ultimate point and break before the desired qualities of the metal are obtained. However, blinds made of such thin sheets of this alloy are too flimsy to be serviceable.

While I have described my invention as applied to a tubular Venetian blind element of rectangular cross section which has been constructed from lock seam tubing, it is to be understood that the principles thereof are not so confined, since my invention may be practiced in the fabrication of any metal object provided with interlocking seams.

I claim:

1. A method of restraining slip in an interlocking seam of a metal product, which comprises stretching said metal beyond its yield point in the direction of said seam.

2. A method of restraining slip in metallic lock seam tubing, which comprises stretching said tubing beyond the yield point of the metal and in the direction of the seam to impart added hardness and strength to the metal.

3. A method of restraining slip in the seam of metal lock seam tubing of rectangular cross-section, which comprises subjecting the tubing to a stretching operation above the yield point of the metal and in the direction of said seam, whereby the strength and hardness of the metal are increased.

4. A method of restraining slip in the seam of metal lock seam tubing of rectangular cross-section adapted for use as a Venetian blind slat, which comprises subjecting said tubing to a stretching operation above the yield point of the metal between retractible stretching means in the direction of the seam of said tubing, whereby the strength and rigidity of the metal and the seam are increased.

5. A metallic article of manufacture having an interlocking seam, said seam having strength and resistance to stress imparted to it by a stretching operation in the direction of said seam to stretch the metal beyond its yield point.

6. An article of manufacture comprising a metal tube having a lock seam therein and being formed from sheet metal, said seam being characterized by strength and resistance to stress imparted to it by a stretching operation beyond the yield point of the metal and in the direction of said seam.

7. An article of manufacture comprising a metal tube having a lock seam and adapted for use as a blind slat, the grains of the metal being fragmented and deformed by a stretching operation in the direction of said seam beyond the yield point of the metal.

8. A method of forming a tube from sheet metal comprising, imparting a tubular formation to a strip of metal to bring its longitudinal edges into adjacently disposed relationship, interlocking said adjacently disposed longitudinal edges to form a longitudinal joint, and thereafter subjecting the tube so formed to a stretching operation beyond the yield point of the metal and in the direction of its longitudinal axis to impart rigidity to the tube and joint.

9. In a method of forming a tubular metallic slat, the steps comprising, imparting a tubular formation to a strip of metal thereby bringing its longitudinal edges into adjacently disposed relationship, forming adjacently disposed longitudinal edges of the strip into an interlocked seam to constitute a longitudinal joint in said tubular slat, and thereafter subjecting the tubular slat to a tensile stress in the direction of the longitudinal joint, said tensile stress being maintained between the yield and ultimate stresses for said metal.

10. A blind slat comprising a single strip of metal having its adjacent longitudinal edges interengaged in lock seam relationship to form a tubular section, said lock seam being characterized by a cold worked structure imparted thereto by tensile force of a magnitude between the yield and ultimate strengths for the metal.

CHARLES BRAGLIO.